(12) United States Patent
Yasutake

(10) Patent No.: US 10,083,023 B2
(45) Date of Patent: Sep. 25, 2018

(54) INFORMATION PROCESSING DEVICE AND PROGRAM UPDATING METHOD

(71) Applicant: FUJITSU LIMITED, Kawasaki-shi, Kanagawa (JP)

(72) Inventor: Toshio Yasutake, Ichikawa (JP)

(73) Assignee: FUJITSU LIMITED, Kawasaki (JP)

( * ) Notice: Subject to any disclaimer, the term of this patent is extended or adjusted under 35 U.S.C. 154(b) by 73 days.

(21) Appl. No.: 14/852,667

(22) Filed: Sep. 14, 2015

(65) Prior Publication Data

US 2015/0378719 A1 Dec. 31, 2015

Related U.S. Application Data

(63) Continuation of application No. PCT/JP2013/058293, filed on Mar. 22, 2013.

(51) Int. Cl.
*G06F 8/65* (2018.01)
*G06F 13/00* (2006.01)
(Continued)

(52) U.S. Cl.
CPC .............. *G06F 8/65* (2013.01); *G06F 9/00* (2013.01); *G06F 13/00* (2013.01); *H04L 67/10* (2013.01); *H04L 67/34* (2013.01)

(58) Field of Classification Search
CPC ... G06F 8/65; G06F 9/00; G06F 13/00; H04L 67/10; H04L 67/34
See application file for complete search history.

(56) References Cited

U.S. PATENT DOCUMENTS

2007/0118617 A1* 5/2007 Lee ........................... G06F 8/65
709/219
2009/0133014 A1* 5/2009 Laurila ..................... G06F 8/60
717/174
(Continued)

FOREIGN PATENT DOCUMENTS

JP 08-083229 3/1996
JP 08-249163 9/1996
(Continued)

OTHER PUBLICATIONS

Japanese Office Action dated Jun. 28, 2016 for corresponding Japanese Patent Application No. 2015-506509, with Partial English Translation, 4 pages. **Please note JP-2004-102379 and JP-2008-225933 cited herewith, were previously cited in an IDS filed Sep. 14, 2015.

(Continued)

*Primary Examiner* — Jacob D Dascomb
(74) *Attorney, Agent, or Firm* — Fujitsu Patent Center

(57) ABSTRACT

An information processing device includes a storage unit that stores a program to be updated and setting information indicating whether updating of the program is valid, a communicator that performs communication via a network, and a processor that executes a process including: when receives update management information indicating a first version of the program, determining whether the program is to be updated on the basis of the first version indicated; determining whether the setting information indicates that updating of the program is valid; when it is determined that the program is to be updated and the setting information indicates that the updating of the program is valid, making a request for data for the updating, and updating the program; and transmitting the update management information, (Continued)

and transmitting the data for the updating in reply to a request from a second information processing device.

9 Claims, 14 Drawing Sheets

(51) Int. Cl.
*G06F 9/00* (2006.01)
*H04L 29/08* (2006.01)

(56) References Cited

U.S. PATENT DOCUMENTS

| | | | |
|---|---|---|---|
| 2011/0107322 A1 | 5/2011 | Hashiguchi | |
| 2011/0179407 A1* | 7/2011 | Minegishi | G06F 8/65 |
| | | | 717/170 |
| 2014/0123123 A1* | 5/2014 | Bahls | G06F 8/71 |
| | | | 717/170 |

FOREIGN PATENT DOCUMENTS

| | | |
|---|---|---|
| JP | 2001-109619 | 4/2001 |
| JP | 2004-102379 | 4/2004 |
| JP | 2008-225933 | 9/2008 |
| JP | 2009-230398 | 10/2009 |
| JP | 2011-095950 | 5/2011 |

OTHER PUBLICATIONS

International Search Report and Written Opinion of the International Searching Authority (Form PCT/ISA/210, Form PCT/ISA/237), mailed in connection with PCT/JP2013/058293 and dated Jun. 11, 2013 (6 pages).

* cited by examiner

FIG. 4

| GUARANTEED COMBINATION | SYSTEM MANAGEMENT BOARD | SYSTEM BOARD | |
| --- | --- | --- | --- |
| | FIRMWARE VERSION NUMBER | BIOS VERSION NUMBER | FIRMWARE VERSION NUMBER |
| 1 | 1.0 | 1.0 | 1.0 |
| 2 | 1.5 | 1.0, 1.2 | 1.0, 1.1 |
| 3 | 1.7 | 1.2, 1.5 | 1.1, 1.4 |
| 4 | 2.0 | 1.2, 1.5, 1.7 | 1.4, 1.6 |

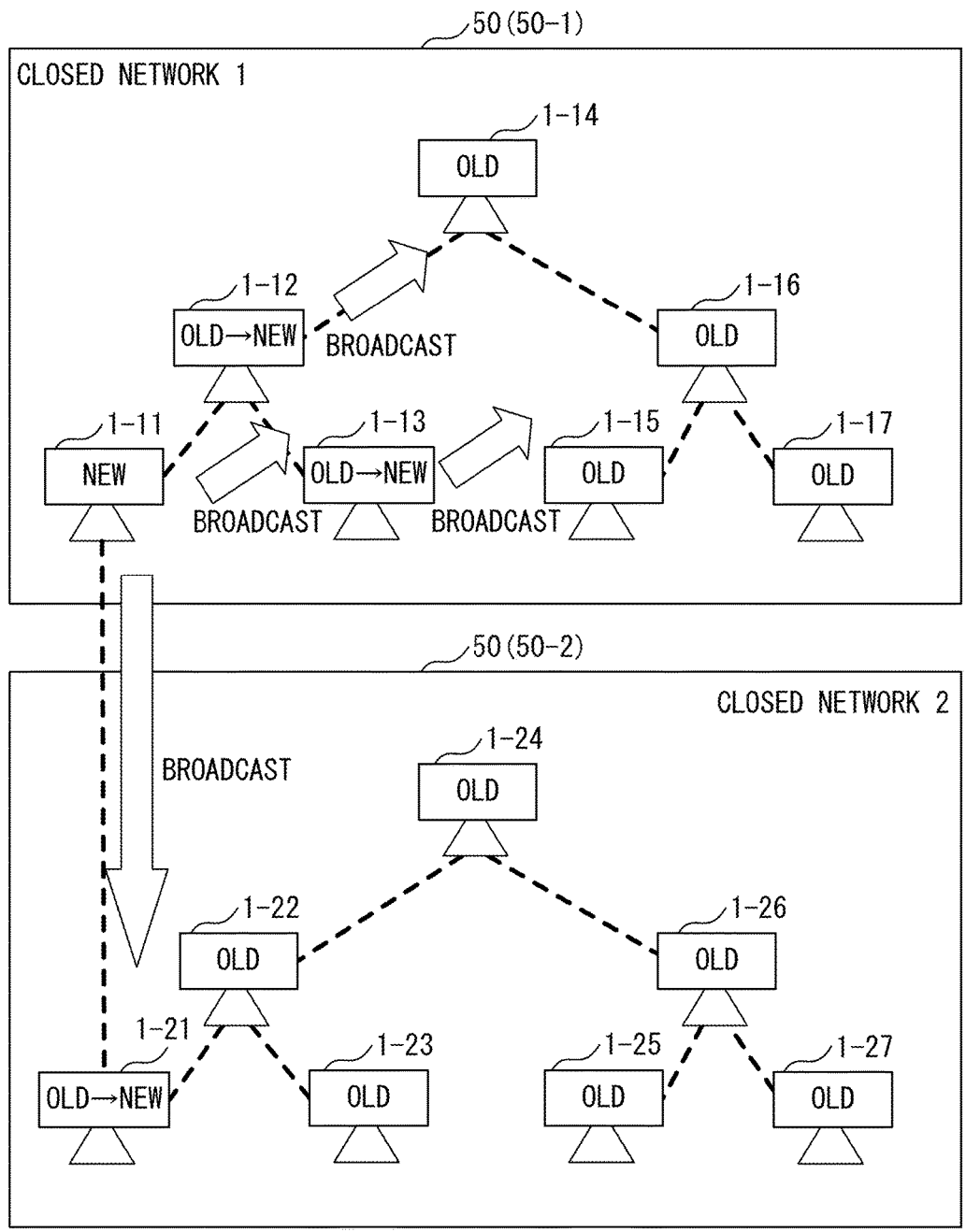
F I G. 5

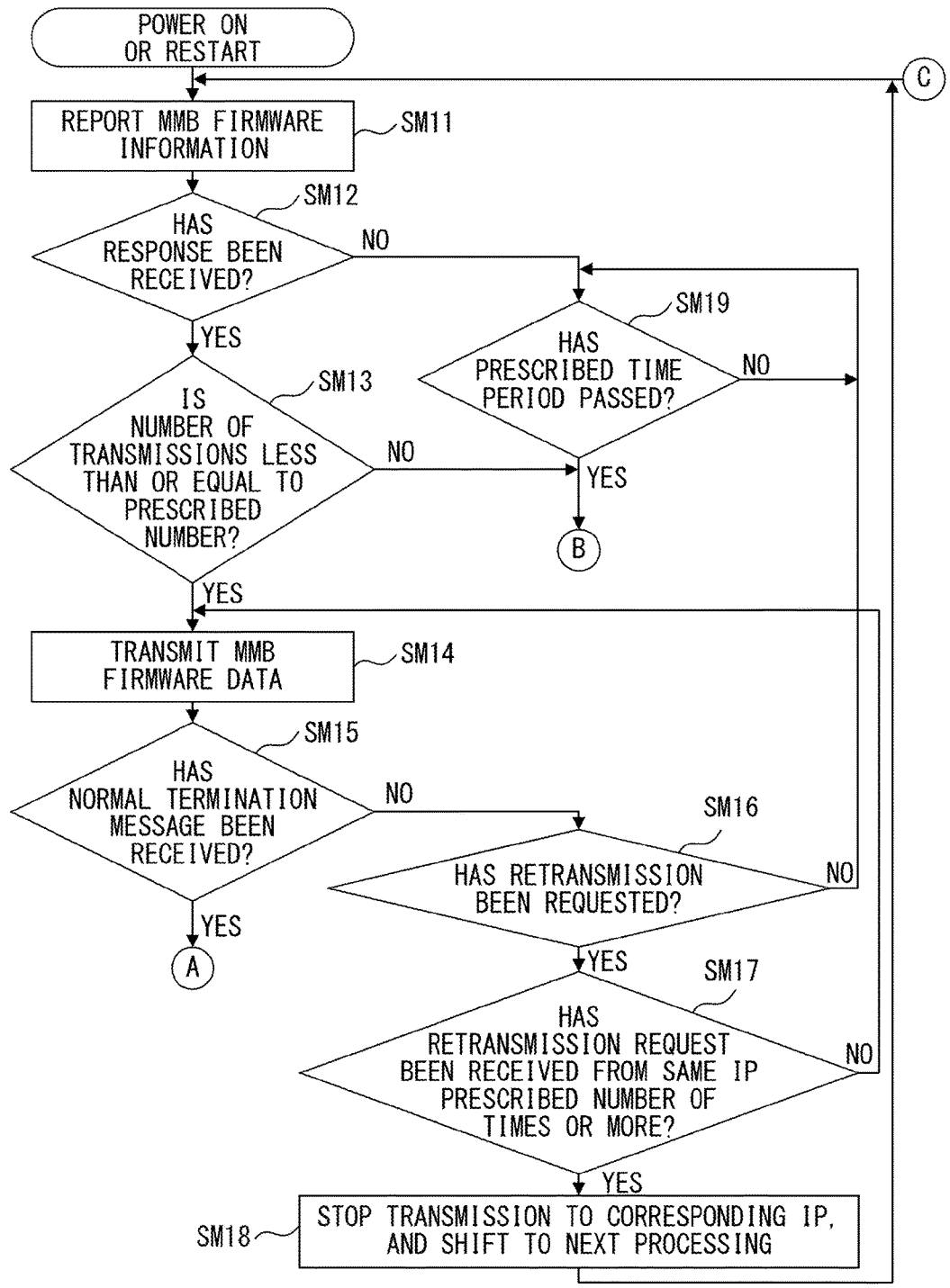
F I G. 7

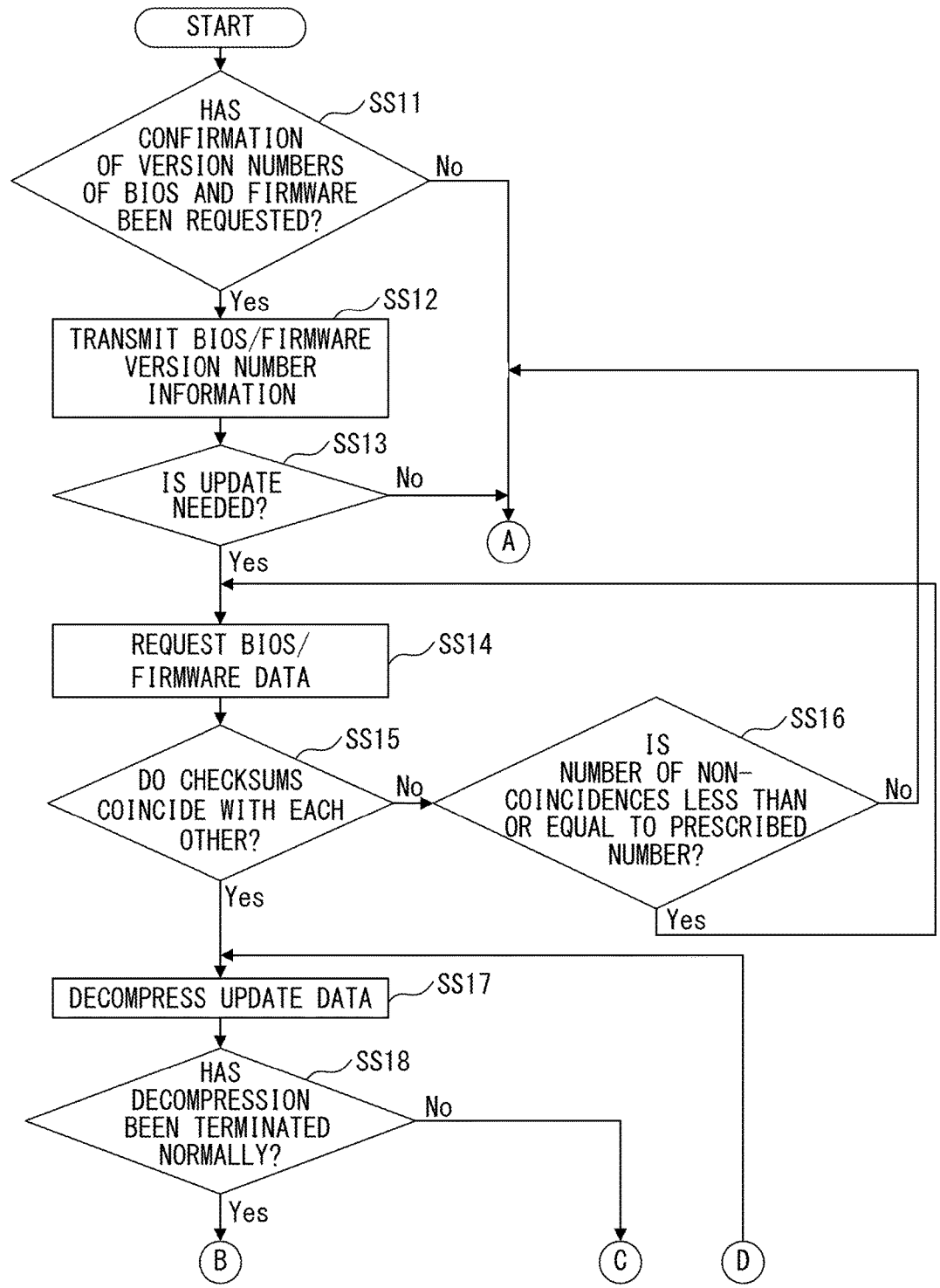
F I G. 1 1

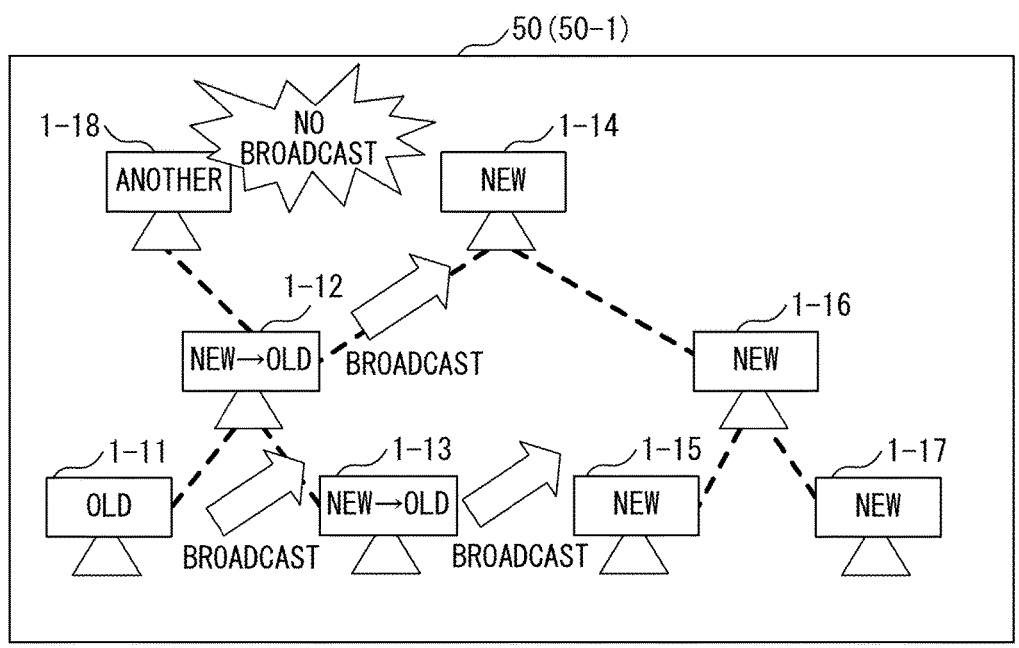
F I G. 14

INFORMATION PROCESSING DEVICE AND PROGRAM UPDATING METHOD

CROSS-REFERENCE TO RELATED APPLICATION

This application is a continuation application of International Application PCT/JP2013/058293 filed on Mar. 22, 2013 and designated the U.S., the entire contents of which are incorporated herein by reference.

FIELD

The embodiment discussed herein is related to a technology for causing respective information processing devices to update a program by performing communication between the respective information processing devices.

BACKGROUND

Most of the programs executed by information processing devices (computers) are updated as needed, for example, in order to add functions or correct failures. Programs to be updated are managed according to versions, and a version number is allocated as identification information to an updated program. This allows a program to be specified with an update content, the newness of a version, or the like by using the version number.

When a program is updated, the same programs executed by information processing devices are targets to be updated. Recently, an increasing number of programs executed by information processing devices have been updated via a network. A program is updated by replacing the entirety of a current program with the entirety of an updated program or by replacing a portion (difference) to be replaced in the current program.

Some programs to be updated need to be updated rapidly in many information processing devices. Such programs include, for example, a program executed by information processing devices that are used as servers.

When there are many information processing devices in which a program is to be updated, updating programs of individual information processing devices imposes a large burden on an administrator, and takes time. In view of this, some conventional information processing devices autonomously update a program by means of communication via a network.

When a conventional information processing device as described above updates a program, the information processing device reports a version number of the updated program to unspecified information processing devices through a network. Another conventional information processing device that has received the report requests a download of the updated program from the conventional information processing device that has reported the version number, and updates the program, when the reported version number is newer than the version number of a currently used program. The other convention information processing device, which has updated the program as described above, reports the version number of the updated program to unspecified information processing devices, similarly to the conventional information processing device that has downloaded the program. As a result, in a system in which a plurality of conventional information processing devices are connected to a network, when one conventional information processing device updates a program, all of the other conventional information processing devices update a program.

An application program executed by a server (hereinafter simply referred to as an "application") differs depending on a user who uses the server. It is common that a view on updating of a program also differs depending on a user. As an example, when a failure has been found in firmware and when firmware of a version in which the failure has been corrected is newly distributed, users who do not care about the failure may refrain from updating the firmware. It is highly likely that a user who is afraid of the existence of a failure that has some influence on the firmware of the new version does not desire updating of the firmware. Considering the existence of the users above, it seems important to prevent programs of information processing devices in which a program is not to be updated from being updated.

In many information processing devices, firmware and OS (Operating System) are executed. Application software designed for a specific purpose such as document preparation or numerical calculation operates on the firmware or the OS. Therefore, a program needs to be updated so as to form a combination in which operations of respective programs are guaranteed, in consideration of other programs executed in the information processing device. In view of this, some conventional information processing devices provide support so as to form a combination in which operations of respective programs are guaranteed, when a certain program is updated in another information processing device connected via a network.

The conventional information processing device that enables the support above is provided as a server, and stores a table indicating combinations in which operations of respective programs are guaranteed. As a result, when one of the programs is updated in a connected personal computer (PC), other programs are updated as needed so as to form the combination indicated by the table.

When updating a program controlled by the conventional information processing device, a user of the PC needs to download software dedicated to the updating and to reply to an inquiry from the software. Therefore, when there are many PCs in which a program is to be updated, a user has to perform very troublesome operations.

Technologies described in the respective documents listed below are known.
[Patent Document 1] Japanese Laid-open Patent Publication No. 2011-95950
[Patent Document 2] Japanese Laid-open Patent Publication No. 2009-230398
[Patent Document 3] Japanese Laid-open Patent Publication No. 8-249163
[Patent Document 4] Japanese Laid-open Patent Publication No. 8-83229
[Patent Document 5] Japanese Laid-open Patent Publication No. 2001-109619

SUMMARY

According to an aspect of the embodiment, an information processing device includes a first storage unit that stores a program to be updated and setting information indicating whether updating of the program is valid, a communicator that performs communication via a network, and a first processor that executes a process including: when the communicator receives update management information indicating a first version of the program from a first information processing device connected to the network, determining whether the program stored in the first storage unit is to be updated on the basis of the first version indicated by the received update management information; determining whether the setting information indicates that updating of the program is valid; when it is determined that the program is to be updated and when it is determined that the setting information indicates that the updating of the program is valid, making a request for data for the updating of the program to the first information processing device and obtaining the data via the communicator, and updating the program stored in the first storage unit by using the obtained data for the updating; and when the program is updated, transmitting the update management information via the communicator, and transmitting the data for the updating via the communicator in reply to a request from a second information processing device that receives the transmitted update management information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram explaining an exemplary configuration of a guaranteed firmware version number compatibility table.

FIG. 5 is a diagram explaining an example of program updating performed by respective information processing devices when information processing devices according to the embodiment are used.

FIG. 7 is a flowchart of update management processing.

FIG. 11 is a flowchart of SB update processing.

FIG. 14 is a diagram explaining another example of program updating performed by respective information processing devices when information processing devices according to the embodiment are used.

DESCRIPTION OF EMBODIMENTS

With reference to the drawings, an embodiment is described below in detail.

Figure 1:
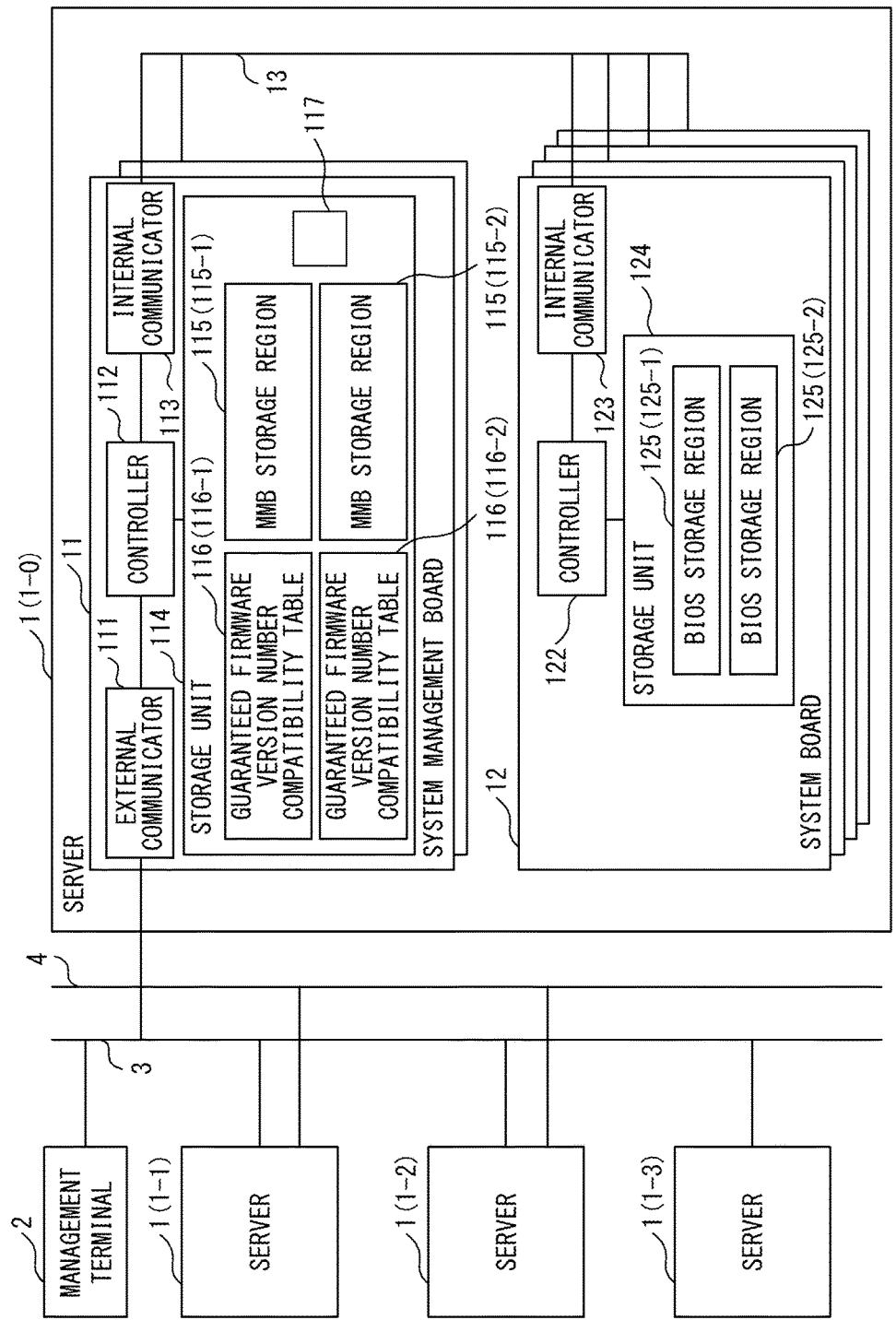
FIG. 1 is a diagram explaining an exemplary configuration of an information processing device according to an embodiment, and an exemplary configuration of a network system adopting the information processing devices.

FIG. 1 is a diagram explaining an exemplary configuration of an information processing device according to the embodiment, and an exemplary configuration of a network system adopting the information processing devices.

The information processing devices according to the embodiment are realized as servers 1 (1-0 to 1-3). A network system has a configuration in which the respective servers 1 are connected to two networks 3 and 4, as illustrated in FIG. 1. To the network 3, a management terminal device 2, which an administrator uses, is connected in addition to the respective servers 1. The network 3 is used principally for management, and the network 4 is used for the servers 1 to perform original processing.

Each of the respective servers 1 includes two system management boards (MMB) 11, a plurality of system boards (SB) 12, and a network 13 that connects the respective system management boards 11 and the respective system boards 12.

The system management board 11 is a processing module that manages the entirety of the server 1, and controls the respective system boards 12. The system management board 11 is duplicated in order to realize high failure resistance.

The system management board 11 includes an external communicator 111, a controller 112, an internal communicator 113, and a storage unit 114, as illustrated in FIG. 1.

The external communicator 111 enables communication via the network 3. The internal communicator 113 enables communication via the network 13. The controller 112 transceiver data via the external communicator 111 or the internal communicator 113 as needed by executing firmware stored in the storage unit 114, and performs control according to the situation.

In the storage unit 114, two MMB storage regions 115, which are regions that store firmware executed by the controller 112, are secured. The controller 112 executes firmware stored in one of the two MMB storage regions 115 (115-1 and 115-2). In addition, in the storage unit 114, at most two guaranteed firmware version number compatibility tables 116 are stored, and an update flag 117 is stored. Details of the update flag 117 and the guaranteed firmware version number compatibility table 116 are described later.

Figure 2:
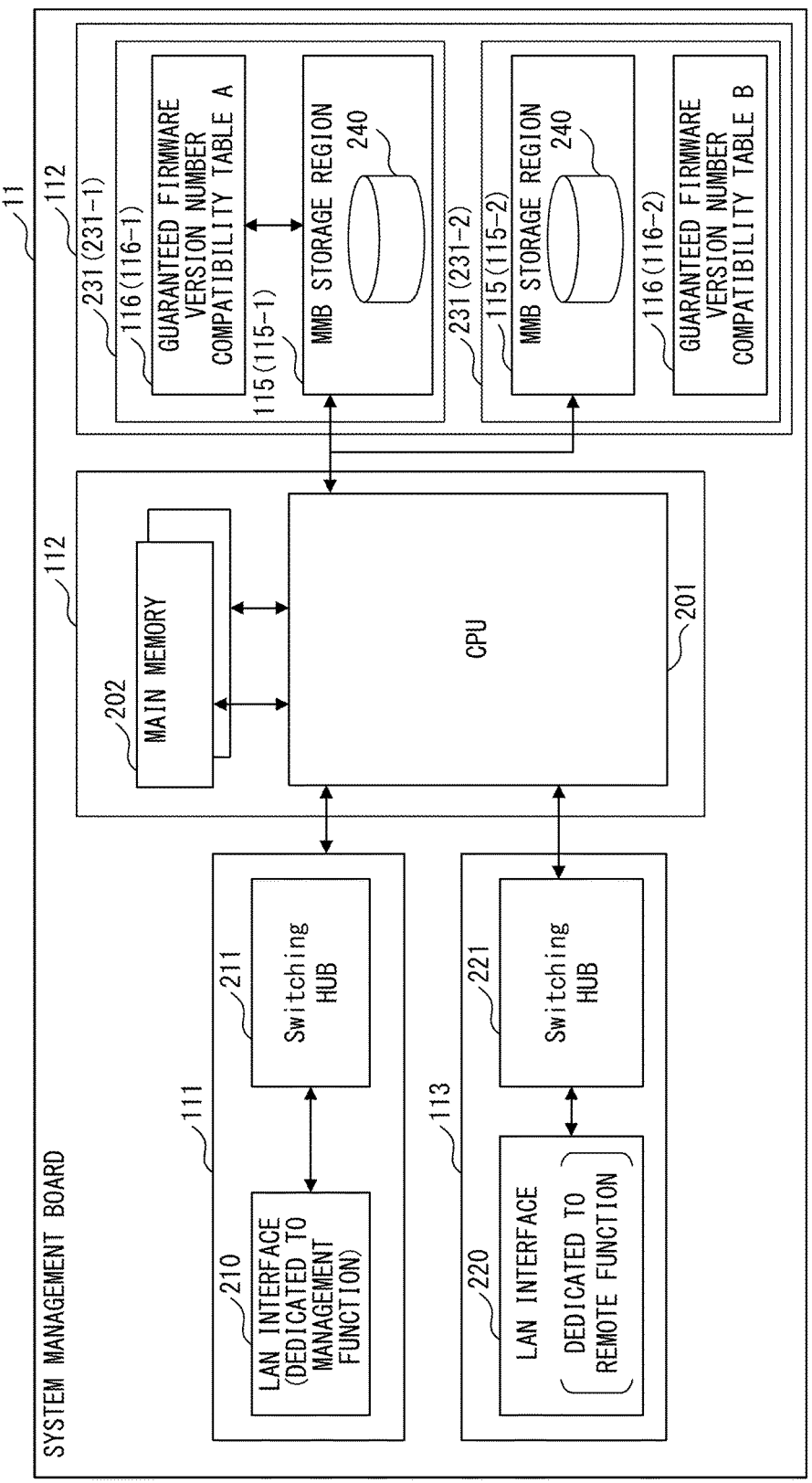
FIG. 2 is a diagram explaining an exemplary configuration of a system management board.

FIG. 2 is a diagram explaining an exemplary configuration of a system management board. As illustrated in FIG. 2, the system management board 11 includes a CPU (Central Processing Unit) 201, a plurality of main memories 202, two LAN (Local Area Network) interfaces 210 and 220, two switching hubs 211 and 221, and two nonvolatile memories 231 (231-1 and 231-2).

The two memories 231 are components of the storage unit 114 illustrated in FIG. 1. In the respective memories 231, the MMB storage region 115 in which firmware 240 is stored is secured, and a guaranteed firmware version number compatibility table 116 is stored. The update flag 117 is stored in one of the two memories 231, or is stored in the two memories 231.

The controller 112 illustrated in FIG. 1 includes the CPU 201 and the plurality of main memories 202 as components. The CPU 201 reads the firmware 240 stored in one of the two memories 231 into the main memory 202, and executes the firmware 240 so as to manage the entirety of the server 1.

The LAN interface 210 and the switching hub 211 are components of the external communicator 111. The LAN interface 220 and the switching hub 221 are components of the internal communicator 113. The CPU 201 controls the LAN interfaces 210 and 220 via the switching hubs 211 and 221 so as to perform communication via the networks 3 and 13.

The firmware 240 stored in each of the memories 231 is a program to be updated. In the embodiment, the two MMB storage regions 115 are secured in order to enable the firmware 240 to be updated also during execution of the firmware 240. Therefore, as an example, when the CPU 201 is executing the firmware 240 stored in the memory 231-1, new firmware 240 is stored in the memory 231-2. Conversely, when the CPU 201 is executing the firmware 240 stored in the memory 231-2, new firmware 240 is stored in the memory 231-1. It is the latest firmware 240 that the CPU 201 reads at start-up.

Meanwhile, the system board 12 is a processing module that provides a service performed by the server 1. The system board 12 includes a control unit 122, an internal communicate unit 123, and a storage unit 124, as illustrated in FIG. 1.

The internal communicate unit 123 enables communication via the network 13. The control unit 122 executes a BIOS (Basic Input/Output System) and firmware that are stored in one of the two BIOS storage regions 125 (125-1 and 125-2) secured in the storage unit 124.

Figure 3:
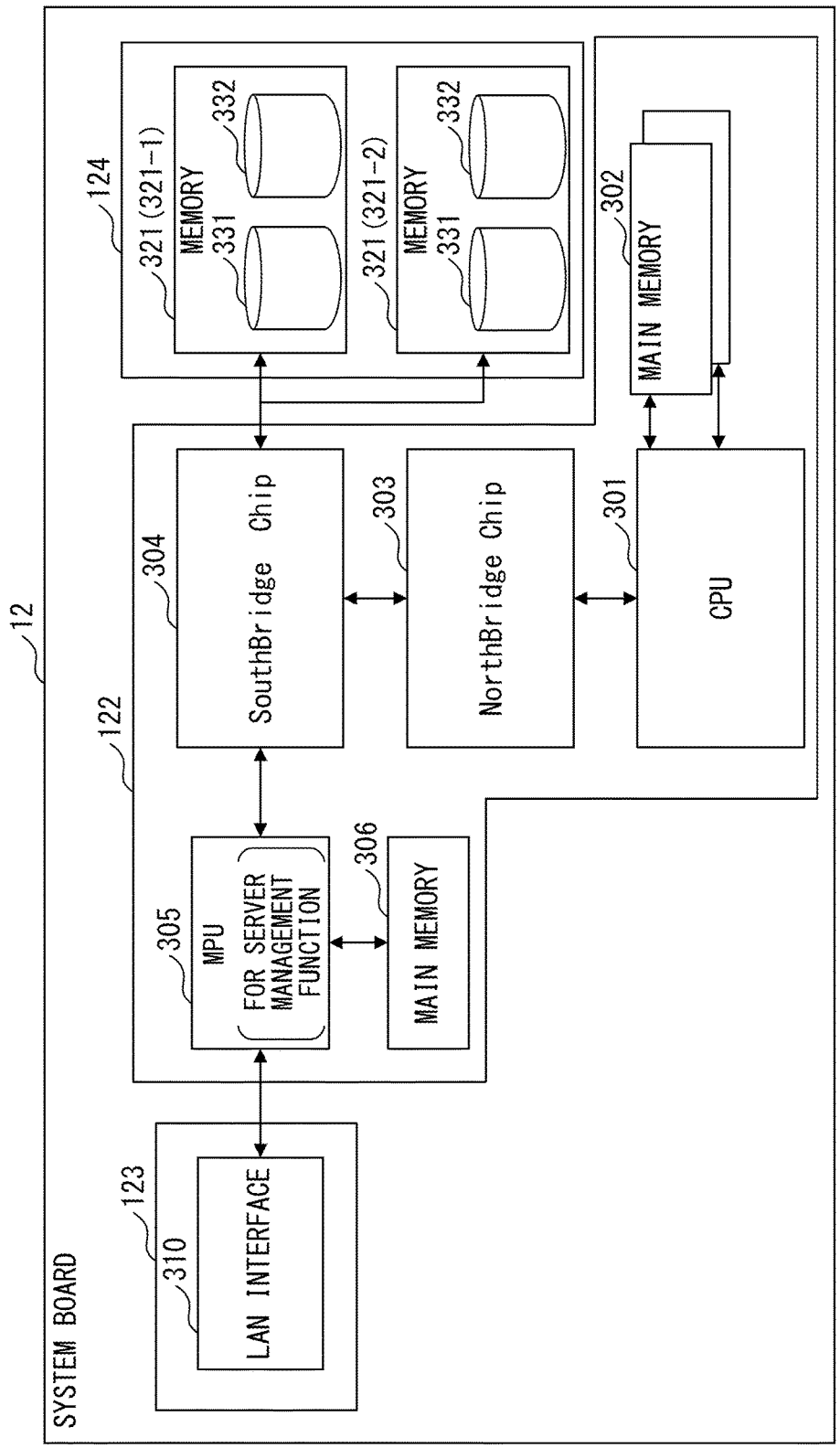
FIG. 3 is a diagram explaining an exemplary configuration of a system board.

FIG. 3 is a diagram explaining an exemplary configuration of a system board. As illustrated in FIG. 3, the system board 12 includes a CPU 301, a plurality of main memories 302, a Northbridge chip 303, a Southbridge chip 304, an MPU (Micro-Processing Unit) 305, a main memory 306, a LAN interface 310, and two nonvolatile memories 321 (321-1 and 321-2).

The LAN interface 310 is a component of the internal communicate unit 123 illustrated in FIG. 1.

The two memories 321 are components of the storage unit 124 illustrated in FIG. 1. In each of the memories 321, a BIOS 331 and firmware 332 are stored. Therefore, the respective memories 321 serve as the BIOS storage regions 125.

The control unit 122 illustrated in FIG. 1 includes the CPU 301, the plurality of main memories 302, the Northbridge chip 303, the Southbridge chip 304, the MPU 305, and the main memory 306 as components. The CPU 301 executes the BIOS 331 stored in one of the two memories 321, and the MPU 305 reads the firmware 332 from the memory 321 in which the BIOS 331 executed by the CPU 301 has been stored, and executes the firmware 332. Therefore, the control unit 122 is configured so as to execute the BIOS 331 and the firmware 332.

After starting the BIOS 331, the CPU 301 further starts an OS (Operating System) and an application. A storage that stores the OS and the application may be mounted on the system board 12, or may be mounted on another processing module. As described above, a position at which a storage is mounted is not particularly limited, and therefore the position is not illustrated in this figure. Both the OS and the application are not important in describing the embodiment.

The CPU 301 enables the server 1 to provide a service by executing the application. The MPU 305 performs processing relating to management of the system board 12 by executing the firmware 332. Therefore, the MPU 305 is a component of, for example, a BMC (Baseboard Management Controller).

In the embodiment, both the BIOS 331 and the firmware 332 executed in the system board 12 are targets to be updated. Therefore, similarly to the system management board 11 above, the respective memories 321 are provided as the respective BIOS storage regions 125, and the BIOS 331 and the firmware 332 are stored in the respective memories 321.

The system management board 11 performs communication, and controls the respective system boards 12. Therefore, the firmware 240 executed in the system management board 11, and the BIOS 331 and the firmware 332 executed in the system board 12 need to form a combination in which operations are guaranteed. The guaranteed firmware version number compatibility table 116 described above stores information for confirming whether the firmware 240, the BIOS 331, and the firmware 332 forma combination in which operations are guaranteed.

FIG. 4 is a diagram explaining an exemplary configuration of a guaranteed firmware version number compatibility table. As illustrated in FIG. 4, in the guaranteed firmware version number compatibility table 116, a guaranteed combination number, a version number of the firmware 240 of the system management board 11, and respective version numbers of the BIOS 331 and the firmware 332 of the system board 12 are stored for each entry.

In the embodiment, a program is updated in the order of the firmware 240 of the system management board 11, and the BIOS 331 and the firmware 332 of the system board 12. The update flag 117 is setting information indicating whether program updating is valid. In the embodiment, when the update flag 117 indicates that program updating is valid, the firmware 240 is updated as needed. By doing this, servers 1 for which a program is not updated can be individually specified from among the servers 1 in the embodiment.

When the servers 1 illustrated in FIG. 1 are respectively used by different users (clients), different applications are usually executed in the respective servers 1. Even when the same application is executed in a plurality of servers 1, version numbers or specifications are often different. By using applications of different version numbers or specifications, even when the same BIOS 331 having a failure is being executed, the failure may be hidden. A user who does not notice the failure may focus on a risk that another failure will surface as a result of performing updating to BIOS 331 of a version in which the failure has been corrected. Therefore, when BIOS 331 of aversion in which the found failure has been corrected is distributed, not all of the users desire to update the BIOS 331. In view of this, in the embodiment, servers 1 for which a program is to be updated are set in advance by using the update flag 117 so as to prevent undesired updating from being performed.

The reason why program updating is not desired is not limited to the above reason. The main reason is that a program is not updated until the reliability of a program of a newly distributed version is confirmed.

The update flags 117 above may be stored (including updating) in the respective servers 1 by using the management terminal device 2. Alternatively, a switch that can switch the content of the update flag 117, or the like may be provided for each of the servers 1, and an update flag 117 having a desired content may be stored by operating the switch.

After an administrator who operates the management terminal device 2 sets the update flag 117 to be set in each of the servers 1, the administrator updates the firmware 240 of the system management board 11, and further updates at least one of the BIOS 331 and the firmware 332 of the system board 12 as needed. A method for performing this update is not particularly limited. In this example, it is assumed for convenience of description that both the BIOS 331 and the firmware 332 of the system board 12 are updated.

When the firmware 240 is updated, the server 1 including the system management board 11 is restarted. The restarted system management board 11 reports MMB firmware information to other servers 1 by broadcasting a message storing the MMB firmware information indicating the version number of the updated firmware 240.

The system management board 11 of the server 1 that has received the message requests data for updating of the firmware 240 as a response to the message, when the version number indicated by the MMB firmware information in the message is newer than the version number of the firmware 240 being executed and when the update flag 117 indicates that updating is valid. Then, the system management board 11 of the server 1 that has received the message updates the firmware 240.

The firmware 240 is updated by storing firmware 240 obtained from the data for updating in a memory 231 in which the firmware 240 being executed has not been stored, as described above. In this example, it is assumed that the data for updating is compressed data of the entirety of the firmware 240. Hereinafter, the compressed data is referred to as "firmware data" or simply as "data". This applies to the BIOS 331 and the firmware 332.

When a version number indicated by the MMB firmware information in the message is not newer than the version number of the firmware 240 being executed, or when the update flag 117 does not indicate that updating is valid, the system management board 11 of the server 1 does not transmit a response. As a result, in the server 1 in which the firmware 240 does not need to be updated or in which the firmware 240 is not to be updated, the firmware 240 is not updated.

The system management board 11 in which the firmware 240 has been updated confirms respective version numbers of the BIOS 331 and the firmware 332 of one of the system boards 12 under control, and refers to the guaranteed firmware version number compatibility table 116. By doing this, the system management board 11 confirms whether the updated firmware 240, the BIOS 331, and the firmware 332 form a combination in which operations are guaranteed. When it is found that the operations are not guaranteed in the combination, the system management board 11 makes a request for respective pieces of data of the BIOS 331 and the firmware 332 to the server 1 from which the system management board 11 has requested the firmware data. The system management board 11 transmits, to respective system boards 12, the respective pieces of data of the BIOS 331 and the firmware 332 that have been received in reply to the request so as to make the respective system boards 12 update the BIOS 331 and the firmware 332.

The system management board 11 of the server 1 in which the firmware 240, the BIOS 331, and the firmware 332 have been updated as described above is restarted, and then broadcasts a message storing MMB firmware information indicating the version number of the updated firmware 240. By doing this, when a program is updated in one server 1, the update is reflected directly or indirectly in other servers 1. As a result, all of the servers 1 in which a program is to be updated can perform needed program updating. An administrator only sets the update flag 117 for each of the servers 1 and updates a program in one server 1, and therefore the administrator can easily make each of the servers 1 perform needed program update.

In the embodiment, when data of the firmware 240 is transmitted, the latest guaranteed firmware version number compatibility table 116 is also transmitted. The system management board 11 of the server 1 that has received the data of the firmware 240 refers to the guaranteed firmware version number compatibility table 116 transmitted along with the data.

It is difficult to predict version numbers of other programs for which operations are guaranteed in combination with a program of the latest version number, and therefore the guaranteed firmware version number compatibility tables 116 need to be stored in servers 1 that are to be updated when any one of the programs is updated. However, an administrator does not need to store in advance the guaranteed firmware version number compatibility tables 116 in respective severs 1 by transmitting the guaranteed firmware version number compatibility table 116 together with firmware data to a server 1. The guaranteed firmware version number compatibility table 116 has only to be directly stored in one server 1 that updates a program. Thus, the burden on an administrator can be reduced by transmitting the guaranteed firmware version number compatibility table 116 together with firmware data to the server 1.

FIG. 5 is a diagram explaining an example of program updating performed by respective information processing devices when information processing devices according to the embodiment are used.

Two closed networks 50 (50-1 and 50-2) illustrated in FIG. 5 are, for example, data centers, and are provided with many servers 1. The two closed networks 50 are connected, for example, via a WAN (Wide Area Network), which is not illustrated. In the example illustrated in FIG. 5, a program of a server 1-11 is updated by an administrator, and as a result of the update, programs of two servers 1-12 and 1-13 are updated in the closed network 50-1 and a program of one server 1-21 is updated in the closed network 50-2.

When update flags 117 of servers 1-14 to 1-17 in the closed network 50-1 indicate that updating is valid, programs of the servers 1-14 to 1-17 are updated as needed. Similarly, when update flags 117 of servers 1-22 to 1-27 in the closed network 50-2 indicate that updating is valid, programs of the servers 1-22 to 1-27 are updated as needed.

Figure 6:
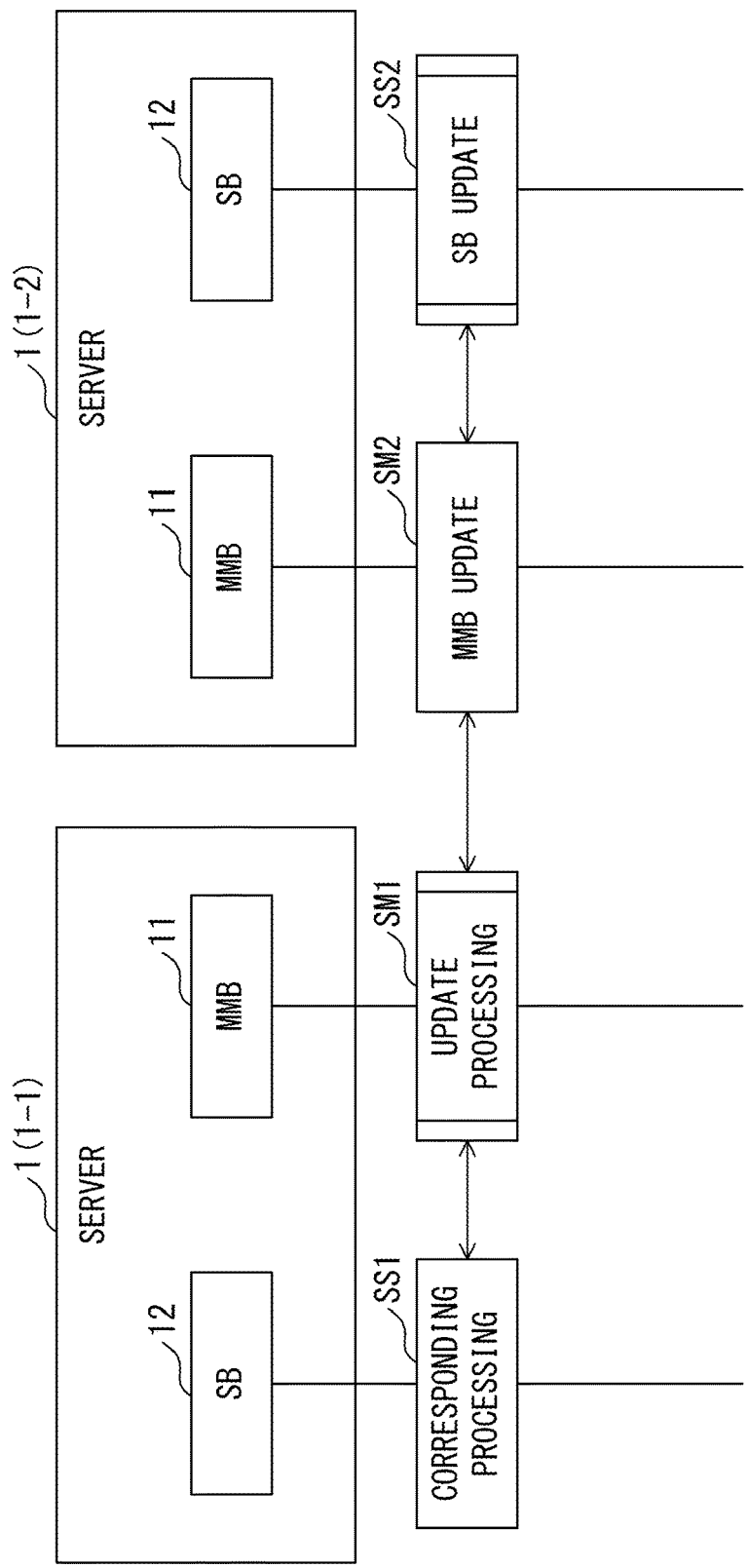
FIG. 6 illustrates processing performed by a system management board and a system board for each of a server in which a program has been updated and a server in which a program will be updated.

FIG. 6 illustrates processing performed by a system management board and a system board for each of a server in which a program has been updated and a server in which a program will be updated. With reference to FIG. 6 and FIGS. 7-13, operations of a server 1-1 in which a program has been updated and a server 1-2 in which a program will be updated as a result of the update in the server 1-1 are described next in detail. In FIG. 6, the system management board 11 is expressed by "MMB", and the system board 12 is expressed by "SB".

When the system management board 11 of the server 1-1 is started or restarted, the system management board 11 performs update management processing for causing other servers 1 to update a program (SM1). When the update management processing is performed, one system board 12 of the server 1-1 performs processing for responding to a request from the system management board 11 (SS1).

Meanwhile, the system management board 11 of the server 1-2 performs MMB update processing for updating a program as needed in reply to the update management processing performed by the system management board 11 of the server 1-1 (SM2). When the MMB update processing is performed, one system board 12 of the server 1-2 performs SB update processing for updating the BIOS 331 and the firmware 332 as needed (SS2).

Data transceiving between the servers 1 is performed between the system management boards 11. Data to be transmitted from the system board 12 to another server 1 is transmitted via the system management board 11 and the network 3. Both the update management processing of SM1 and the MMB update processing of SM2 are realized when the CPU 201 of the system management board 11 executes the firmware 240. Both corresponding processing of SS1 and the SB update processing of SS2 are realized when the MPU 305, for example, executes the firmware 332.

With reference to FIG. 7 to FIG. 13, operations of a server in which a program has been updated and a server in which a program will be updated are described below in detail.

Figure 12:
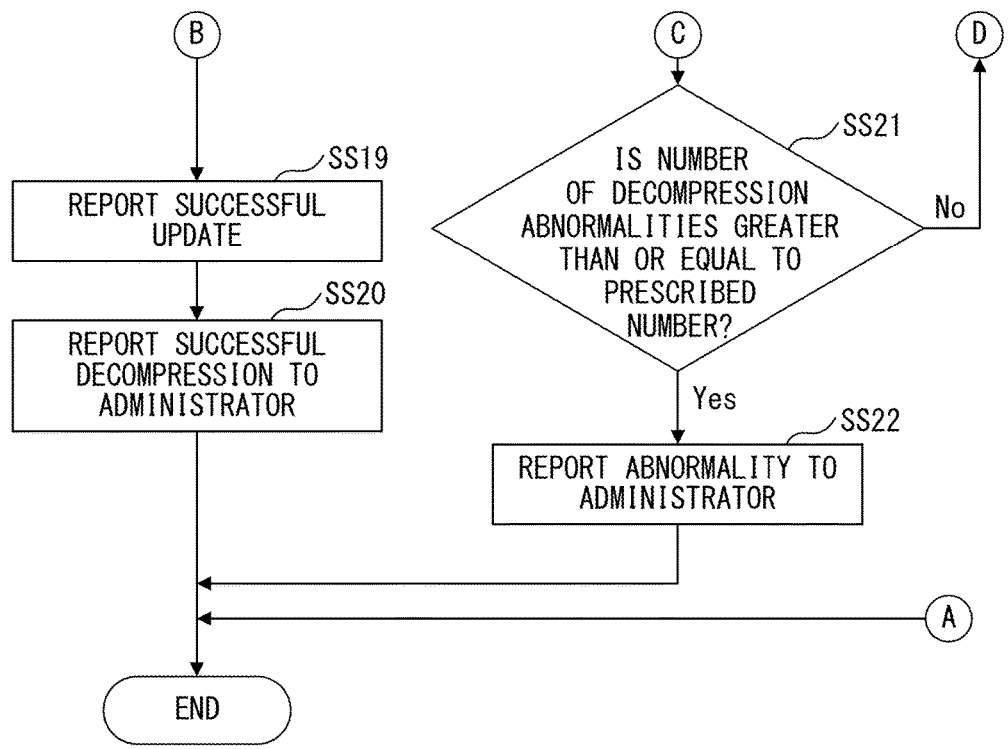
FIG. 12 is a flowchart (continued) of SB update processing.
Figure 13:
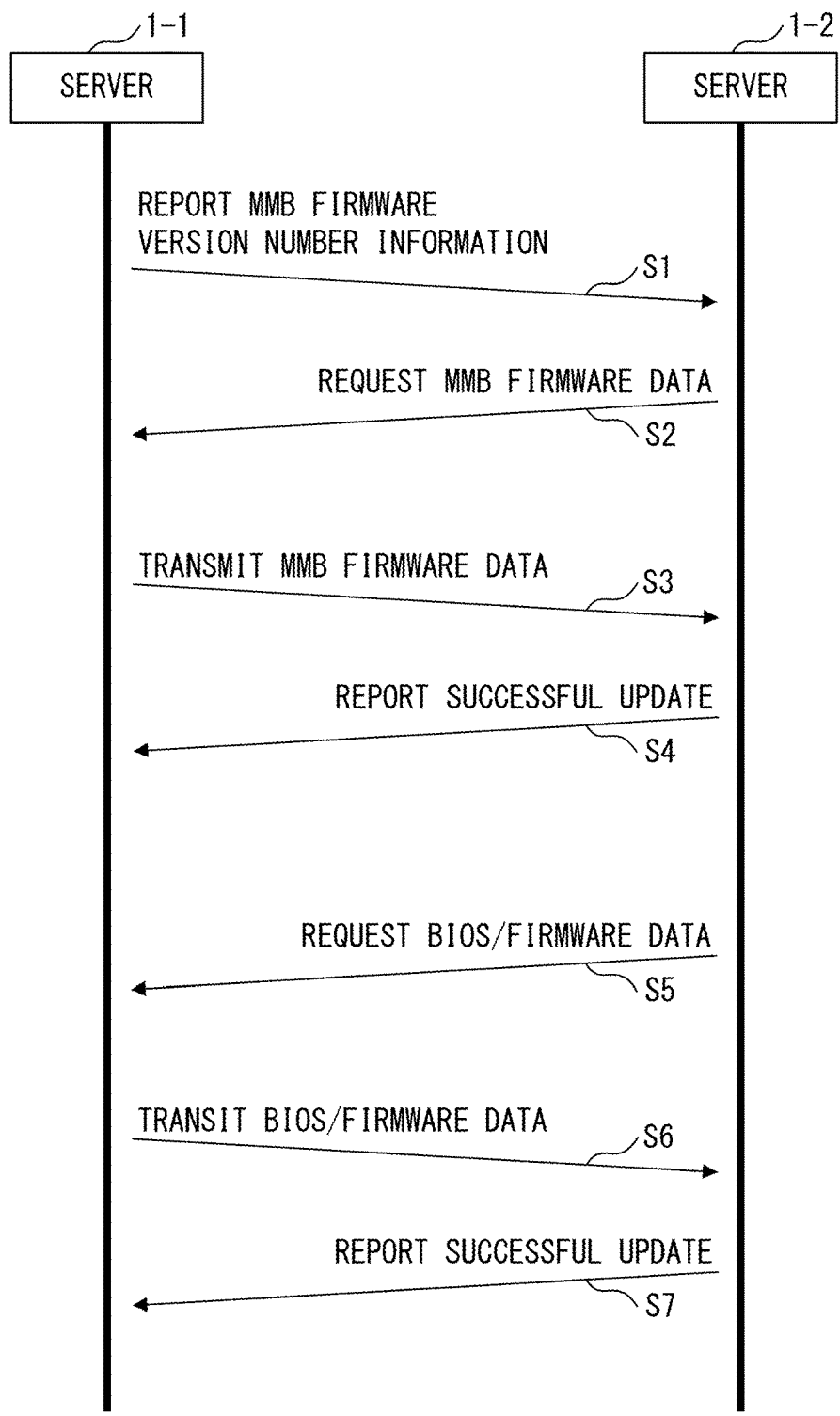
FIG. 13 is a sequence diagram illustrating an example of transceiving data between a server in which a program has been updated and a server in which a program will be updated.

FIG. 13 is a sequence diagram illustrating an example of transceiving data between a server in which a program has been updated and a server in which a program will be updated. FIG. 13 is described along with descriptions of FIG. 7 to FIG. 12.

Figure 8:
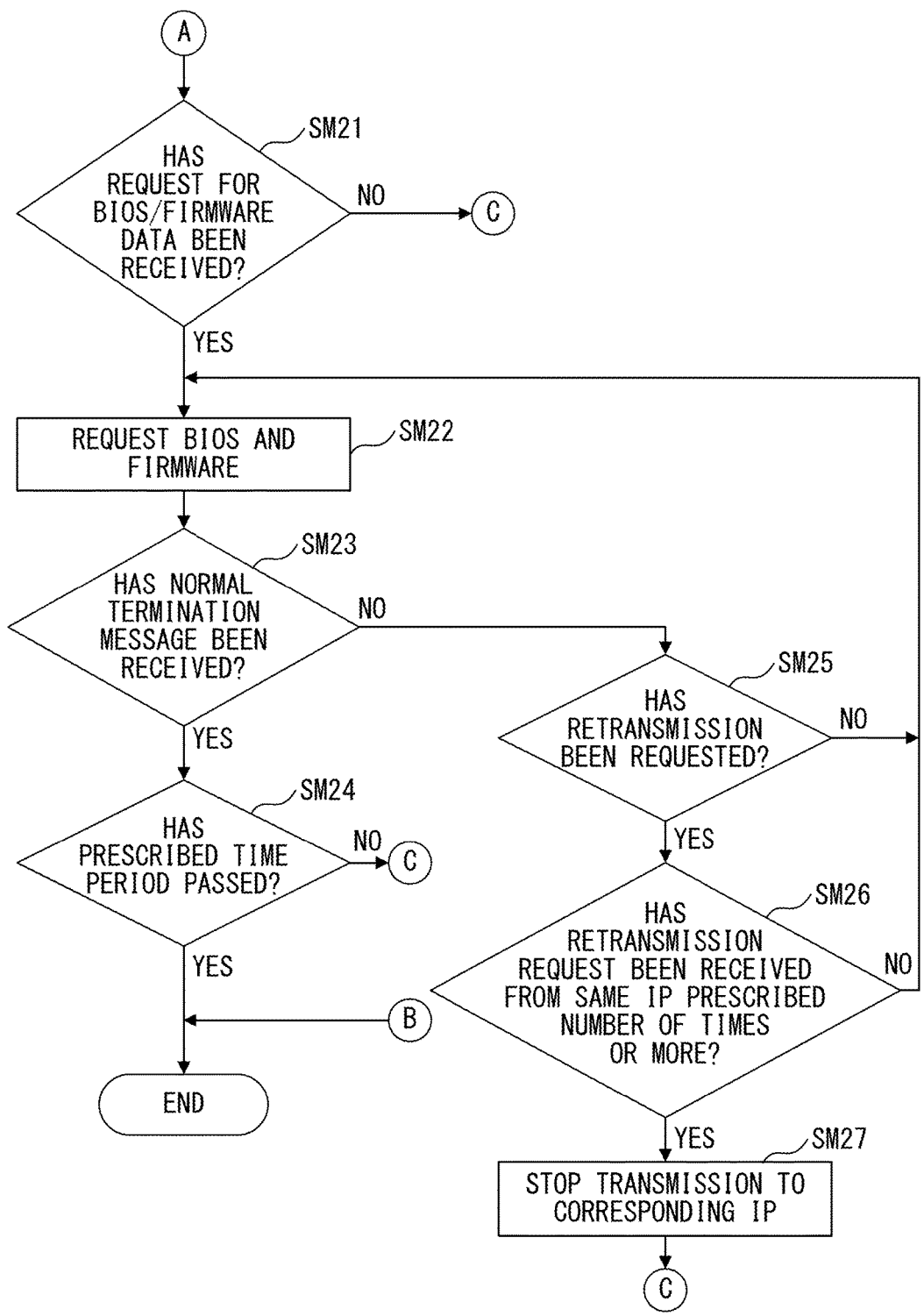
FIG. 8 is a flowchart (continued) of update management processing.

FIG. 7 and FIG. 8 are flowcharts of the update management processing performed in SM1.

With reference to FIG. 7 and FIG. 8, the update management processing is described next in detail.

The update management processing is processing performed in order to cause other servers 1 to update a program, as described above. The number of servers 1 in which a program is updated is an arbitrary number between 0 and the number of servers 1 that can receive a message. For ease of understanding, FIG. 7 and FIG. 8 illustrate a flow of processing performed under the assumption that a program of one server 1 is updated.

The CPU 201 first generates a message storing the MMB firmware information indicating a version number of the updated firmware 240, or the like, and makes the LAN interface 210 broadcast the generated message (SM11, and a sequence of S1 in FIG. 13). The CPU 201 then monitors reception by the LAN interface 210 of a response, and determines whether a response has been received from any of the servers 1 (SM12). When any of the servers 1 transmits a response, the determination in SM12 is "Yes", and the process moves onto SM13. When no servers 1 transmit a response, the determination in SM12 is "No", and the process moves on to SM19.

In SM19, the CPU 201 determines whether a prescribed time period has passed. The prescribed time period is a time period that is set in order to respond to updating of a program in another server 1 during a limited time period. When a time period that has passed after a message storing the MMB firmware information was first transmitted does not exceed the prescribed time period, the determination in SM19 is "No", and the process returns to SM11 above. As a result, the CPU 201 transmits the message again. When a time period that has passed after a message storing the MMB firmware information was first transmitted exceeds the prescribed time period, the determination in SM19 is "Yes", and the update management processing is terminated.

As described above, data of the firmware 240 is transmitted to the server 1 from which the response has been received. In SM13, the CPU 201 determines whether the number of transmissions of data of the firmware 240 to the server 1 from which the response has been received is less than or equal to a prescribed number of times. When the number of transmissions is less than or equal to a prescribed number, the determination in SM13 is "Yes", and the process moves on to SM14. When the number of transmissions exceeds a prescribed number, the determination in SM13 is "No", and the update management processing is terminated. The prescribed number is a threshold value that is set in order to prevent the firmware 240 from being transmitted without any restriction.

In SM14, the CPU 201 transmits data of the firmware 240 to the server 1 from which the response has been received (a sequence of S3 in FIG. 13). The CPU 201 then determines whether a message indicating that reception has terminated normally has been received from a server 1 that is a destination of the data of the firmware 240 (SM15). When a message indicating that reception has terminated normally has been received, the determination in SM15 is "Yes", and the process moves on to SM21 in FIG. 8. When a message indicating that reception has terminated normally has not been received, the determination in SM15 is "No", and the process moves on to SM16.

In SM16, the CPU 201 determines whether a message for requesting retransmission has been received. When a message for requesting retransmission has been received, the determination in SM16 is "Yes", and the process moves on to SM17. When a message for requesting retransmission has not been received, the determination in SM16 is "No", and the process returns to SM14 above. As a result, the CPU 201 makes the data of the firmware 240 be transmitted again.

In SM17, the CPU 201 determines whether a message for requesting retransmission has been received from the same server 1 (expressed by "the same IP" in FIG. 7; "IP" is an abbreviation for "Internet Protocol") a prescribed number of times or more. When a message for requesting retransmission has been received from the same server 1 a prescribed number of times or more, the determination in SM17 is "Yes", and the CPU 201 stops transmission of the data of firmware 240 to the server 1 that has transmitted the message for requesting retransmission (SM18). Then, the process returns to SM11 above. When a message for requesting retransmission has not been received from the same server 1 a prescribed number of times or more, the determination in SM17 is "No", and the process returns to SM14 above.

In SM21 of FIG. 8, the CPU 201 determines whether a message for requesting respective pieces of data of the BIOS 331 and the firmware 332 has been received from the server 1. When the message has been received, the determination in SM21 is "Yes", and the process moves on to SM22. When the message has not been received, the determination in SM21 is "No", and the process returns to SM11 of FIG. 7.

In SM22, the CPU 201 makes a request for the respective pieces of data of the BIOS 331 and the firmware 332 to one system board 12 via the LAN interface 220, obtains the respective pieces of data, and transmits the obtained respective pieces of data from the LAN interface 210 (a sequence of S6 in FIG. 13). The CPU 201 then determines whether a message indicating normal termination has been received from the server 1 (SM23). When a message indicating normal termination has been received, the determination in SM23 is "Yes", and the process moves on to SM24. When a message indicating normal termination has not been received, the determination in SM23 is "No", and the process moves on to SM25.

In SM24, the CPU 201 determines whether a prescribed time period has passed. When a time period after a message storing the MMB firmware information was first transmitted reaches the prescribed time period, the determination in SM24 is "Yes", and the update management processing is terminated. When a time period after a message storing the MMB firmware information was first transmitted does not reach the prescribed time period, the determination in SM24 is "No", and the process returns to SM11 in FIG. 7.

In SM25, the CPU 201 determines whether a message for requesting retransmission has been received. When a message for requesting retransmission has been received, the determination in SM25 is "Yes", and the process moves on to SM26. When a message for requesting retransmission has not been received, the determination in SM25 is "No", and the process returns to SM22 above. As a result, the CPU 201 transmits each piece of data of the BIOS 331 and the firmware 332 again.

In SM26, the CPU 201 determines whether a message for requesting retransmission has been received from the same server 1 a prescribed number of times or more. When a message for requesting retransmission has been received from the same server 1 a prescribed number of times or more, the determination in SM26 is "Yes", and the CPU 201 then stops transmission of respective pieces of data of the BIOS 331 and the firmware 332 to the server 1 that transmitted the message for requesting retransmission (SM27). Then, the process returns to SM11 of FIG. 7. When a message for requesting retransmission has not been received from the same server 1 a prescribed number of times or more, the determination in SM26 is "No", and the process returns to SM22 above.

In SM22 above, the CPU 201 makes a request for respective pieces of data of the BIOS 331 and the firmware 332 to one system board 12. The MPU 305 of the system board 12 that has received the request reads the respective pieces of data of the firmware 332 and the BIOS 331 from the memory 321 storing the firmware 332 being executed, and makes the LAN interface 310 transmit the read respective pieces of data. In the corresponding processing in SS1 of FIG. 6, processing for transmitting respective pieces of data of the BIOS 331 and the firmware 332 to the system management board 11 is performed in reply to a request from the system management board 11.

Figure 9:
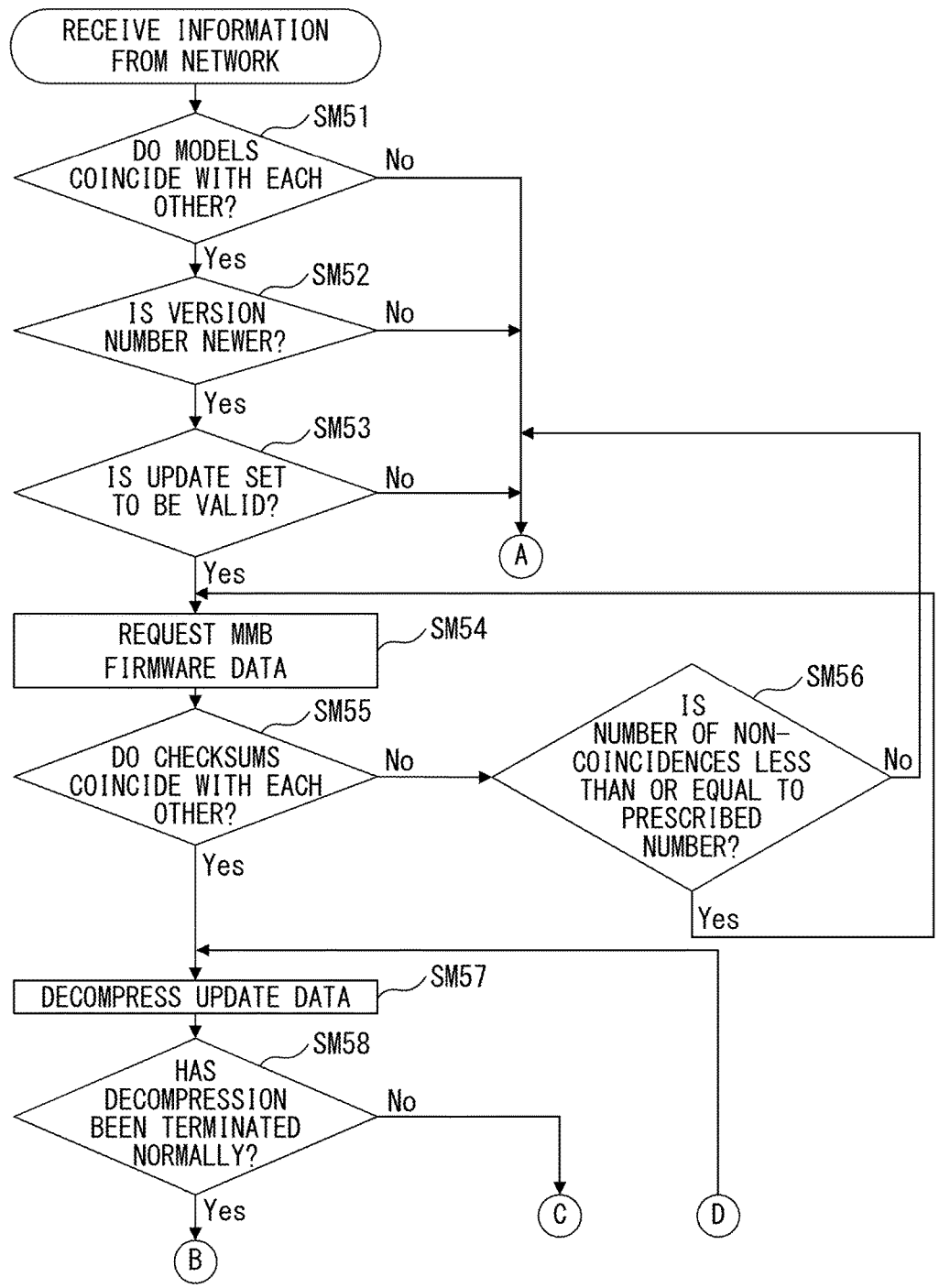
FIG. 9 is a flowchart of MMB update processing.
Figure 10:
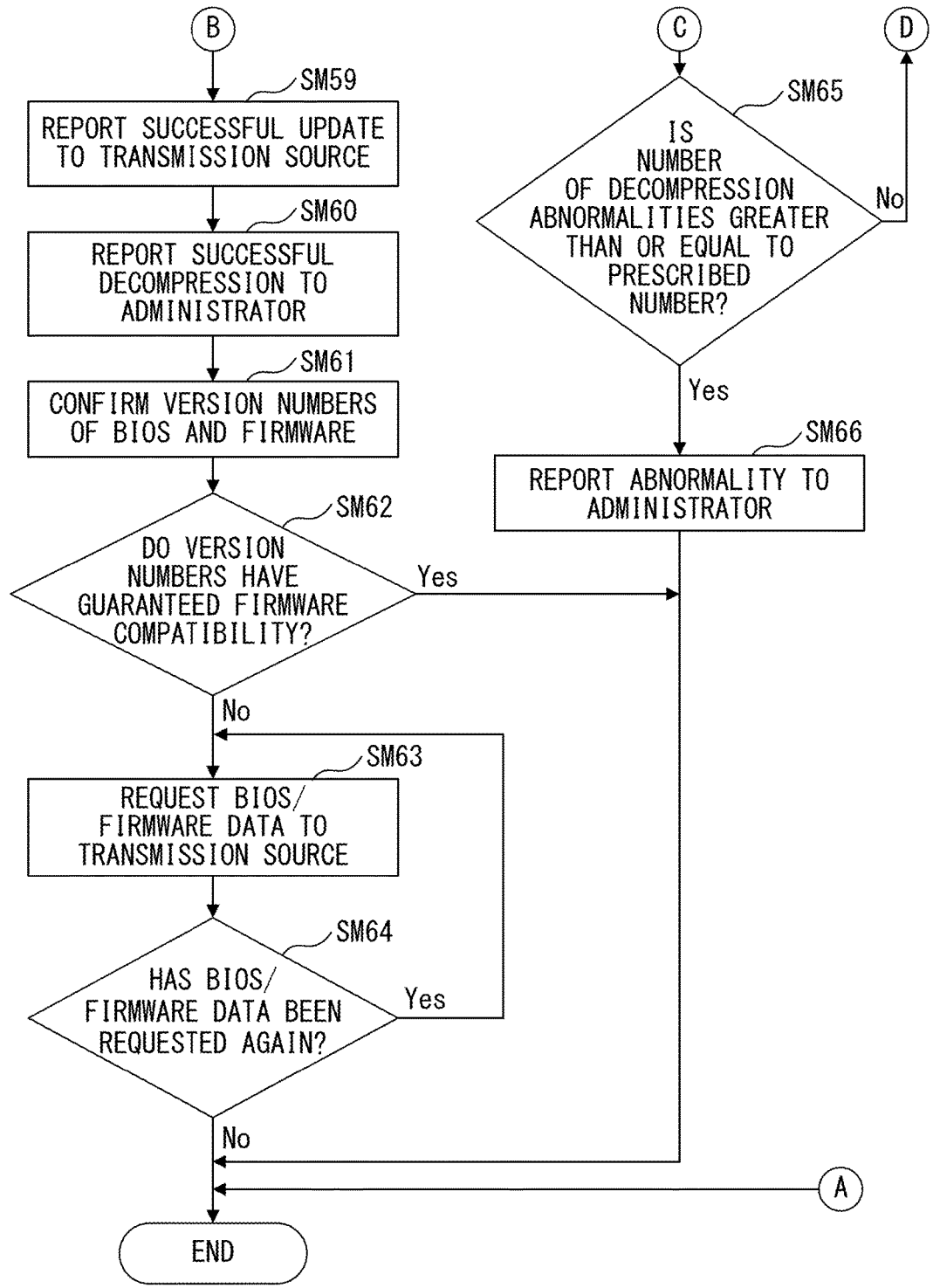
FIG. 10 is a flowchart (continued) of MMB update processing.

FIG. 9 and FIG. 10 are flowcharts of the MMB update processing performed in SM2. With reference to FIG. 9 and FIG. 10, the MMB update processing is described next in detail.

The CPU 201 on the system management board 11 that performs the update management processing broadcasts a message storing the MMB firmware information in SM1. The MMB update processing is performed upon receipt of the message.

The CPU 201 first determines whether a model of a server 1 indicated by the MMB firmware information in the received message is a model that executes the same type of program (SM51). When the type of a program to be updated coincides with the type of a program of the server 1 that has transmitted the message, the determination in SM51 is "Yes", and the process moves on to SM52. When the type of a program to be updated does not coincide with the type of a program of the server 1 that has transmitted the message, the determination in SM51 is "No", and the MMB update processing is terminated.

In SM52, the CPU 201 determines whether a version number of the firmware 240 indicated by the MMB firmware information in the received message is newer than a version number of the firmware 240 being executed. When the server 1 that has transmitted the message has been updated to firmware 240 of a newer version number, the determination in SM52 is "Yes", and the process moves on to SM53. When the server 1 that has transmitted the message has not been updated to firmware 240 of a newer version number, the determination in SM52 is "No", and the MMB update processing is terminated.

In SM53, the CPU 201 determines whether updating has been set to be valid. When the update flag 117 indicates that updating is valid, the determination in SM53 is "Yes", and the process moves on to SM54. When the update flag 117 does not indicate that updating is valid, the determination in SM53 is "No", and the MMB update processing is terminated.

In SM54, the CPU 201 transmits a message for requesting data of the firmware 240 to the server 1 that has received the message via the LAN interface 210 (a sequence of S2 in FIG. 13), and obtains the requested data. The CPU 201 then determines whether a checksum calculated from the obtained data coincides with a checksum in the obtained data (SM55). When an error occurs before the data is obtained, the checksums do not coincide with each other. Therefore, the determination in SM55 is "No", and the process moves onto SM56. When an error does not occur before the data is obtained, the determination in SM55 is "Yes", and the process moves on to SM57.

In SM56, the CPU 201 determines whether the number of non-coincidences of checksums is less than or equal to a prescribed number. When data of the firmware 240 has been received a prescribed number of times but checksums do not coincide with each other, the determination in SM56 is "No", and the MMB update processing is terminated. When data of the firmware 240 has not been received a prescribed number of times, the determination in SM56 is "Yes", and the process returns to SM54 above. As a result, the CPU 201 requests transmission of the data of the firmware 240 again.

In SM57, the CPU 201 decompresses the received data, extracts the firmware 240, writes the extracted firmware 240 to a memory 231 in which unexecuted firmware 240 has been stored, and also writes the guaranteed firmware version number compatibility table 116 to the same memory 231. The CPU 201 then determines whether data decompression has been terminated normally (SM58). When the firmware 240 is written normally to the memory 231, the determination in SM58 is "Yes", and the process moves on to SM59 of FIG. 10. When the firmware 240 is not written normally to the memory 231, the determination in SM58 is "No", and the process moves on to SM65 of FIG. 10.

In SM59, the CPU 201 instructs the LAN interface 210 so as to transmit a message indicating successful updating to a server 1 that has transmitted the data of the firmware 240 (a sequence of S4 in FIG. 13). The CPU 201 then instructs the LAN interface 210 so as to report successful updating of the firmware 240 to the management terminal device 2 (SM60). Successful updating is reported, for example, via email.

The CPU 201 then uses the LAN interface 220 so as to makes a request, to one system board 12, for a report about respective version numbers of the BIOS 331 and the firmware 332, and confirms the respective version numbers reported in reply to the request (SM61). After confirmation, the CPU 201 refers to the guaranteed firmware version number compatibility table 116 stored in the memory 231, and determines whether an operation of a combination of the updated firmware 240, and the BIOS 331 and the firmware 332 executed by the system board has been guaranteed (SM62). When an operation of a combination of the firmware 240, the BIOS 331, and the firmware 332 has not been guaranteed, the determination in SM62 is "No", and the process moves on to SM63. When the operation of the combination has been guaranteed, the determination in SM62 is "Yes", and the MMB update processing is terminated.

In SM63, the CPU 201 uses the LAN interface 210 so as to transmit a message for requesting respective pieces of data of the BIOS 331 and the firmware 332 to a server 1 from which the data of the firmware 240 has been received (a sequence of S5 in FIG. 13). When the respective pieces of data of the BIOS 331 and the firmware 332 are received from a server 1 that has received the message, the CPU 201 uses the LAN interface 220 so as to transmit the received respective pieces of data to respective system boards 12, and instructs updating. After instructing updating, the CPU 201 determines when transmission of the respective pieces of data of the BIOS 331 and the firmware 332 has been requested from any of the system boards (SM64).

The MPU 305 of each of the system boards 12 writes the BIOS 331 and the firmware 332 restored from the transmitted respective pieces of data of the BIOS 331 and the firmware 332 to a memory 321 in which unexecuted firmware 332 has been stored. The MPU 305 uses the LAN interface 310 so as to report, to the system management board 11, results of updating the BIOS 331 and the firmware 332 as described above. The MPU 305 that has failed to store at least one of the BIOS 331 and the firmware 332 in the memory 321 normally makes a request for transmission of respective pieces of data of the BIOS 331 and the firmware 332 to the system management board 11. The MPU 305 that has stored the BIOS 331 and the firmware 332 in the memory 321 normally reports successful update to the system management board 11.

When any of the system boards 12 has failed to appropriately update the BIOS 331 or the firmware 332, the determination in SM64 is "Yes", and the process returns to SM63 above. In this case, the CPU 201 transmits respective pieces of data of the BIOS 331 and the firmware 332 only to system boards 12 that have failed to appropriately update the BIOS 331 or the firmware 332. When there are no system boards 12 that have failed to appropriately update the BIOS 331 and the firmware 332, the determination in SM64 is "No", a message indicating successful updating of the BIOS 331 and the firmware 332 is transmitted to the server 1 (a sequence of S7 in FIG. 13), and the MMB update processing is terminated.

In SM65 of FIG. 10 to which the process moves on when the determination in SM58 of FIG. 9 is "No", the CPU 201 determines whether the number of abnormal decompressions is greater than or equal to a prescribed number. When abnormal decompression consecutively occurs a prescribed number of times or more, the determination in SM65 is "Yes", and the process moves onto SM66. When abnormal decompression does not consecutively occur a prescribed number of times or more, the determination in SM65 is "No", and the process moves on to SM57 of FIG. 9.

In SM66, the CPU 201 uses the LAN interface 210 so as to report to the management terminal device 2 that an abnormality of unsuccessful updating of the firmware 240 has occurred. The report about the occurrence of unsuccessful updating is performed, for example, via email. After performing the above report, the MMB update processing is terminated.

When the determination in SM62 above is "Yes", it is reported to a system board 12 that has requested a report about respective version numbers of the BIOS 331 and the firmware 332 that the BIOS 331 and the firmware 332 do not need to be updated. When the determination in SM62 is "No", it is reported to respective system boards 12 that the BIOS 331 and the firmware 332 need to be updated. As a result, respective pieces of data of the BIOS 331 and the firmware 332 are requested in SM63 by a request from any of the system boards 12.

FIG. 11 and FIG. 12 are flowcharts of the SB update processing performed in SS2. Finally, with reference to FIG. 11 and FIG. 12, the SB update processing is described in detail.

In SM61 of FIG. 10, a request is made to one system board 12 for a report about respective version numbers of the BIOS 331 and the firmware 332. The SB update processing illustrated in FIG. 11 and FIG. 12 is processing performed by the MPU 305 in reply to the request for the report.

The MPU 305 first determines whether a report about respective version numbers of the BIOS 331 and the firmware 332 has been requested from the system management board 11 (SS11). When a report about respective version numbers is requested from the system management board 11, the determination in SS11 is "Yes", and the process moves on to SS12. When a report about respective version numbers is not requested from the system management board 11, the determination in SS11 is "No", and the SB update processing is terminated.

In SS12, the MPU 305 uses the LAN interface 310 so as to transmit information indicating the requested version numbers to the system management board 11. The MPU 305 then determines whether a message indicating that the BIOS 331 and the firmware 332 need to be updated has been received from the system management board 11, after transmission (SS13). When the determination in SM62 of FIG. 10 is "No", the system management board 11 transmits a message indicating that updating is needed to respective system boards 12. Therefore, the determination in SS13 is "Yes", and the process moves on to SS14. When the determination in SM62 is "Yes", the system board 12 transmits a message indicating that updating is not needed to a local system management board 11. Therefore, the determination in SS13 is "No", and the SB update processing is terminated.

In SS14, the MPU 305 uses the LAN interface 310 so as to make a request for transmission of respective pieces of data of the BIOS 331 and the firmware 332 to the system management board 11. In SS15 that follows, the MPU 305 waits for receipt of the respective pieces of data of the BIOS 331 and the firmware 332 from the system management board 11, and determines whether a checksum calculated from the received pieces of data coincides with a checksum in the obtained data. When an error occurs before the data is obtained, the checksums do not coincide with each other. Therefore, the determination in SS15 is "No", and the process moves onto SS16. When an error does not occur before the data is obtained, the determination in SS15 is "Yes", and the process moves on to SS17.

In SS16, the MPU 305 determines whether the number of non-coincidences of checksums is less than or equal to a prescribed number. When respective pieces of data of the BIOS 331 and the firmware 332 have been received a prescribed number of times but checksums do not coincide with each other, the determination in SS16 is "No", and the SB update processing is terminated. When respective pieces of data of the BIOS 331 and the firmware 332 have not been received a prescribed number of times, the determination in SS16 is "Yes", and the process returns to SS14 above. As a result, the MPU 305 requests transmission of respective pieces of data of the BIOS 331 and the firmware 332 again.

In SS17, the MPU 305 decompresses the received pieces of data, and writes the extracted BIOS 331 and the firmware 332 to a memory 321 in which unexecuted firmware 332 has been stored. The MPU 305 then determines whether data decompression has been terminated normally (SS18). When the BIOS 331 and the firmware 332 have been written normally to the memory 231, the determination in SS18 is "Yes", and the process moves on to SS19 of FIG. 12. When the BIOS 331 or the firmware 332 has not been written normally to the memory 321, the determination in SS18 is "No", and the process moves on to SS21 of FIG. 12.

In SS19, the MPU 306 uses the LAN interface 310 so as to transmit a message indicating successful updating of the BIOS 331 and the firmware 332 to the system management board 11. The MPU 305 then uses the LAN interface 310 so as to ask the system management board 11 to report successful updating to the management terminal device 2 (SS20). Then, the SB update processing is terminated.

In SS21 of FIG. 12 to which the process moves on when the determination in SS18 of FIG. 11 is "No", the MPU 305 determines whether the number of abnormal decompressions is greater than or equal to a prescribed number. When abnormal decompression consecutively occurs a prescribed number of times or more, the determination in SS21 is "Yes", and the process moves onto SS22. When abnormal decompression does not consecutively occur a prescribed number of times or more, the determination in SS21 is "No", and the process moves on to SS17 of FIG. 11.

In SS22, the MPU 305 uses the LAN interface 310 so as to ask the system management board 11 to report to the management terminal device 2 that an abnormality of unsuccessful updating of the BIOS 331 and the firmware 332 has occurred. Then, the SB update processing is terminated.

In the embodiment, whether a program is updated is controlled by using the update flags 117 stored in respective servers 1; however, control information such as the update flag 117 may be transmitted along with the MMB firmware information or data of the firmware 240. In the embodiment, programs are updated in the order of the firmware 240, and the BIOS 331 and the firmware 332, but updating is not limited to this order. Programs to be updated may be arbitrarily selected from among the firmware 240, the BIOS 331, and the firmware 332. A combination of programs for which operations are guaranteed is not limited to a combination of the firmware 240, the BIOS 331, and the firmware 332. A combination of programs for which operations are guaranteed may be set by an administrator as needed.

In the embodiment, it is assumed that a program is updated to a newer version; however, the embodiment is not limited to the assumption of updating to a newer version. Namely, it may be assumed that a version-down operation to an older version is performed on a program. As illustrated in FIG. 14, in aversion-down operation to an older version of a program, respective servers 1 can update a program, similarly to updating of a program to a newer version. Whether updating of a program to a newer version is valid and whether a version-down operation to an older version of a program is valid can be controlled, for example, by preparing respective dedicated update flags 117.

Even when a failure occurs in a CPU package (processor), one system to which the embodiment is applied can further effectively prevent an operation state from deteriorating due to the failure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
   a first storage that stores a program to be updated and setting information indicating whether the information processing device is a target for updating of the program;
   a network interface that connects to a network and that performs communication via the network;
   a first processor that executes a process including:
      when the network interface receives update management information indicating a first version of the program from a first information processing device connected to the network, determining whether the program stored in the first storage is to be updated based on the first version indicated by the received update management information;
      determining whether the setting information indicates that the information processing device is the target for updating of the program;
      when it is determined that the program is to be updated and when it is determined that the setting information indicates that the information processing device is the target for updating of the program, making a request for data used for the updating of the program to the first information processing device and obtaining the data via the network interface, and updating the program stored in the first storage by using the obtained data used for the updating;
      transmitting, when the program is updated, the update management information indicating a version of the updated program stored in the first storage of the information processing device via the network interface; and
      transmitting the obtained data used for the updating via the network interface when a request for the obtained data used for the updating is received, the request for the obtained data being requested by a second information processing device that receives the transmitted update management information;
   a second storage that stores another program for which a combination with the program is to be considered, wherein
   the first storage stores, for each version of the program, operation guarantee information indicating a version of the another program for which an operation performed in combination with the program of the version is guaranteed,
   the process further includes:
      determining, when the program is updated, whether an operation of the program of the first version that is executed in combination with the another program has been guaranteed by referring to the operation guarantee information, and
      when it is determined that the operation of the program of the first version in combination that is executed with the another program has not been guaranteed, making a request for another piece of data for updating of the another program to the first information processing device and to obtain the another piece of data via the network interface, and
   the information processing device further includes a second processor that executes a process including:
      updating the another program stored in the second storage by using the obtained another piece of data for updating.

2. The information processing device according to claim 1, wherein
   in the first storage, a plurality of regions in which the program is stored are secured, and
   the updating updates the program stored in the first storage by storing a program of the first version in the region different from the region in which the program is currently stored.

3. The information processing device according to claim 1, wherein
in the second storage, a plurality of regions that store the another program are secured, and
the updating of the another program updates the another program stored in the second storage by storing the another program based on the another piece of data for the updating in another region different from a region in which the another program is stored.

4. The information processing device according to claim 1, wherein the operation guarantee information is transmitted along with the another piece of data for the updating, and is stored in the first storage.

5. The information processing device according to claim 1, wherein the program and the another program are executed by different types of processing modules mounted on the information processing device.

6. A program updating method comprising:
when update management information indicating a first version of a program to be updated is received from a first information processing device connected to a network, performing, by a computer, a first determination in which it is determined whether a program stored in a first storage is to be updated on the basis of the first version indicated by the received update management information;
performing, by the computer, a second determination in which it is determined whether setting information stored in a second storage indicates that the computer is a target for updating of the program;
when it is determined in the first determination that the program is to be updated and when it is determined in the second determination that the setting information indicates that the computer is the target for updating of the program, making, by the computer, a request for data used for the updating of the program to the first information processing device and obtaining the data, and updating, by the computer, the program stored in the first storage by using the obtained data used for the updating;
when the program is updated, transmitting, by the computer, the update management information indicating a version of the updated program stored in the first storage;
transmitting, by the computer, the obtained data used for the updating when a request for the obtained data used for the updating is received, the request for the obtained data being requested by a second information processing device that receives the transmitted update management information;
determining a second storage that stores another program for which a combination with the program is to be considered;
determining the first storage stores, for each version of the program, operation guarantee information indicating a version of the another program for which an operation performed in combination with the program of the version is guaranteed;
determining, when the program is updated, whether an operation of the program of the first version that is executed in combination with the another program has been guaranteed by referring to the operation guarantee information;
when it is determined that the operation of the program of the first version in combination that is executed with the another program has not been guaranteed, making a request for another piece of data for updating of the another program to the first information processing device and to obtain the another piece of data via the network interface, and
updating the another program stored in the second storage by using the obtained another piece of data for updating.

7. A non-transitory computer-readable recording medium having stored therein a program for causing a computer to execute a process comprising:
when update management information indicating a first version of a program to be updated is received from a first information processing device connected to a network, performing a first determination in which it is determined whether a program stored in a first storage is to be updated on the basis of the first version indicated by the received update management information;
performing a second determination in which it is determined whether setting information stored in a second storage indicates that the computer is a target for updating of the program;
when it is determined in the first determination that the program is to be updated and when it is determined in the second determination that the setting information indicates that the computer is the target for updating of the program, making a request for data used for the updating of the program to the first information processing device and obtaining the data, and updating the program stored in the first storage by using the obtained data used for the updating;
when the program is updated, transmitting the update management information indicating a version of the updated program stored in the first storage;
transmitting the obtained data used for the updating when a request for the obtained data used for the updating is received, the request for the obtained data being requested by a second information processing device that receives the transmitted update management information;
determining a second storage that stores another program for which a combination with the program is to be considered;
determining the first storage stores, for each version of the program, operation guarantee information indicating a version of the another program for which an operation performed in combination with the program of the version is guaranteed;
determining, when the program is updated, whether an operation of the program of the first version that is executed in combination with the another program has been guaranteed by referring to the operation guarantee information;
when it is determined that the operation of the program of the first version in combination that is executed with the another program has not been guaranteed, making a request for another piece of data for updating of the another program to the first information processing device and to obtain the another piece of data via the network interface, and
updating the another program stored in the second storage by using the obtained another piece of data for updating.

8. An information processing device comprising:
a first storage that stores a program to be updated;
a second storage that stores another program which is executed in combination with the program stored in the first storage;

a third storage that stores, for each version of the program stored in the first storage, operation guarantee information indicating a version of the another program for which an operation performed in combination with the program is guaranteed;

a communicator that communicates with another information processing device; and a processor that executes a process including:

obtaining a piece of data from another information processing device which possesses the piece of data for updating the program stored in the first storage;

determining whether updating the program stored in the first storage is to be performed based on update management information indicating a version of the program stored in the first storage, the update management information being received from the another information processing device;

when it is determined that updating the program stored in the first storage is to be performed, updating the program stored in the first storage using the piece of data;

determining, when the program stored in the first storage is updated, whether an operation of a version of the another program stored in the second storage that is executed in combination with a version of the program after the updating has been guaranteed by referring to the operation guarantee information;

when it is determined that the operation of the version of the another program stored in the second storage that is executed in combination with the version of the program after the updating has not been guaranteed, obtaining another piece of data for updating the another program stored in the second storage from another information processing device which possesses the another piece of data;

when the another piece of data is obtained, updating the another program stored in the second storage using the another piece of data;

when the program stored in the first storage is updated, controlling the communicator to transmit update management information indicating a version of the updated program stored in the first storage of the information processing device; and in response to a request from another information processing device that has received the transmitted update management information, controlling the communicator to transmit the piece of data for updating the program stored in the first storage.

9. The information processing device according to claim 8, further comprising a fourth storage that stores setting information indicating whether the information processing device is a target for updating of the program stored in the first storage, wherein the program stored in the first storage is updated when the setting information indicates that the information processing device is the target for updating of the program stored in the first storage.

* * * * *